US006104710A

United States Patent [19]

Miyashita

[11] Patent Number: 6,104,710

[45] Date of Patent: Aug. 15, 2000

[54] RADIO SELECTIVE PAGING RECEIVER WITH TIME SETTING WHICH AVOIDS RECEIVER NOISE

[75] Inventor: Mafumi Miyashita, Shizuoka, Japan

[73] Assignee: NEC Corporation, Tokyo, Japan

[21] Appl. No.: 08/856,649

[22] Filed: May 15, 1997

[30] Foreign Application Priority Data

May 24, 1996 [JP] Japan .................................... 8-129666

[51] Int. Cl.$^{7}$ ........................................................ H04Q 1/00

[52] U.S. Cl. .................... 370/350; 340/825.44; 370/311; 370/503; 370/517; 368/47

[58] Field of Search ....................... 340/825.44; 370/311, 370/314, 326, 350, 503, 517, 519; 368/21, 47; 455/310

[56] References Cited

U.S. PATENT DOCUMENTS 4,845,491 7/1989 Fascenda ............................ 340/825.44
5,089,814 2/1992 DeLuca .............................. 340/825.44
5,473,638 12/1995 Marchetto ............................... 370/517
5,640,697 6/1997 Orndorf ................................... 455/310
5,712,867 1/1998 Yokev ................................ 340/825.44
5,714,944 2/1998 Shimizu ............................ 340/825.44
5,765,113 6/1998 Russo ...................................... 455/310

FOREIGN PATENT DOCUMENTS 6-284072 10/1994 Japan .

*Primary Examiner*—Brian Zimmerman
*Attorney, Agent, or Firm*—Scully, Scott Murphy & Presser

[57] ABSTRACT

A radio selective paging receiver includes a reception unit, a control unit, and a timepiece unit. The reception unit is controlled to start transmission in synchronism with at least a standard time, receives a radio signal modulated by a selective paging signal containing time information in transmission information, and demodulates the radio signal. The control unit controls operation of the reception unit, determines call reception and time information in accordance with the demodulated signal, and processes the call reception and the time information. The timepiece unit at least temporarily holds the obtained time. In setting the time information obtained by operating the reception unit to the timepiece unit, the control unit adjusts the time with a predetermined time lag such that a carry to the minute or hour unit is not generated at a predetermined timing self data is received.

3 Claims, 6 Drawing Sheets

FIG. 4

| SELF FRAME NUMBER | LENGTH OF TIME LAG |
|---|---|
| 0 | −100msec |
| 1 | +150msec |
| 2 | +150msec |
| ⋮ | |
| n | −100msec |
| ⋮ | |

RADIO SELECTIVE PAGING RECEIVER WITH TIME SETTING WHICH AVOIDS RECEIVER NOISE

BACKGROUND OF THE INVENTION

1. Field of the Invention

The present invention relates to a radio selective paging receiver and, more particularly, to a radio selective paging receiver capable of automatically adjusting the timepiece function of the radio selective paging receiver by using time information contained in a paging signal.

2. Description of the Prior Art

As disclosed in, e.g., Japanese Unexamined Patent Publication No. 6-284072, a conventional radio selective paging receiver having a time adjustment function adjusts the time of the timepiece unit upon receiving a signal transmitted from a radio transmission station in synchronism with a standard time determined in units of regions.

The signal from the radio transmission station is constituted by a plurality of frames. A reference frame for time adjustment is transmitted at the timing of 0 minute and 0 second of the standard time.

For this reason, the radio selective paging receiver can precisely set the time.

Generally, a receiver having a timepiece function has not only the timepiece function but also additional functions including time display and alarm/scheduler. Since time display update processing or processing of the above additional functions is performed at the timing of a carry forward to the minute or hour unit, in addition to processing of the timepiece itself, the control unit for performing processing generates processing noise.

The above-described radio selective paging receiver allows highly precise time setting by the timepiece function. However, if the timing when self data is received matches that of a carry to the minute unit, undesired noise is repeatedly generated because the precision is high, and both cycles are synchronized with the standard time.

In some radio selective paging receivers, therefore, the reception sensitivity may suffer or information for time adjustment may not be satisfactorily acquired in some cases.

SUMMARY OF THE INVENTION

The present invention has been made to eliminate the above disadvantages of the prior art, and has as its object to provide a radio selective paging receiver which can prevent processing noise generated by time adjustment processing by setting the time while adding a predetermined time lag to time information extracted from radio information, thereby enabling stable reception.

In order to achieve the above object, according to the basic aspect of the present invention, there is provided a radio selective paging receiver comprising a reception unit which is controlled to start operation in synchronism with at least a standard time, receives a radio signal modulated by a selective paging signal containing time information in transmission information, and demodulates the radio signal, a control unit for controlling an operation state of the reception unit, determining call reception and time information in accordance with the demodulated signal, and processing the call reception and the time information, and a timepiece unit for at least temporarily holding an obtained time, wherein, in setting the time information obtained by operating the reception unit to the timepiece unit, the control unit adjusts the time with a predetermined time lag such that a carry to the minute or hour unit is not generated at a predetermined timing when self data is received.

In order to achieve the above object, according to the second aspect of the present invention, there is provided a radio selective paging receiver, wherein the control unit according to the basic aspect adjusts the time with the predetermined time lag such that the carry to the minute or hour unit is not generated in a self data reception frame and is generated in a frame unit for battery savings.

In order to achieve the above object, according to the third aspect of the present invention, there is provided a radio selective paging receiver, wherein, when the frame units for battery savings are defined by consecutive numbers, the control unit according to the second aspect switches the time lag value depending on whether a self battery saving frame unit is an even or odd frame.

In order to achieve the above object, according to the fourth aspect of the present invention, there is provided a radio selective paging receiver, wherein the control unit according to the second aspect adjusts the time with the predetermined time lag such that the carry to the minute or hour unit is not generated at a time when the time information is received.

In a transmission system which transmits a signal containing time information, the timing of starting to transmit the first frame data is set at the timing of a carry forward to the minute unit (0 minute and 0 second). A receiver belonging to this first frame adjusts the time with a predetermined time lag such that the timing of a carry to the minute unit is more advanced than the original (precise) timing of the carry to the minute unit by the time necessary for self time adjustment. Since the time required for time adjustment processing is generally sufficiently short for the receiver owner, the precision of the timepiece is not lowered.

A receiver belonging to a group in which the timing of the carry to the minute unit does not match the timing of self frame reception adjusts the time with a predetermined time lag such that the timing of starting to transmit data to the group for receiving the time information is delayed from the original timing of the carry to the minute unit by the maximum time for which the time information can be transmitted. Generally, the time information is set at the start of the frame to be transmitted. For this reason, even when the time is updated with the time lag, the time lag can be minimized so that the receiver owner is unconscious of it.

In the present invention, time adjustment is performed while adding a time lag to the time information extracted from radio information. With this arrangement, in reception of self frame data, noise generated by time adjustment started by a carry to the minute unit can be prevented.

Also, the influence of noise generated by time adjustment started by a carry to the minute unit can be eliminated upon receiving time information.

Moreover, since the influence of noise generated upon time adjustment can be eliminated in respect of time, no special noise measures need be taken upon system design, and no precautions need be taken as to the layout of the control unit and the radio reception unit.

The above and many other objects, features and advantages of the present invention will become manifest to those skilled in the art upon making reference to the following detailed description and accompanying drawings in which preferred embodiments incorporating the principles of the present invention are shown by way of illustrative example.

BRIEF DESCRIPTION OF THE DRAWINGS

FIG. 4 is a view showing an example of a time lag in time setting of the present invention;

DETAILED DESCRIPTION OF THE PREFERRED EMBODIMENTS

The preferred embodiments of the present invention will be described below with reference to the accompanying drawings.

Figure 1:
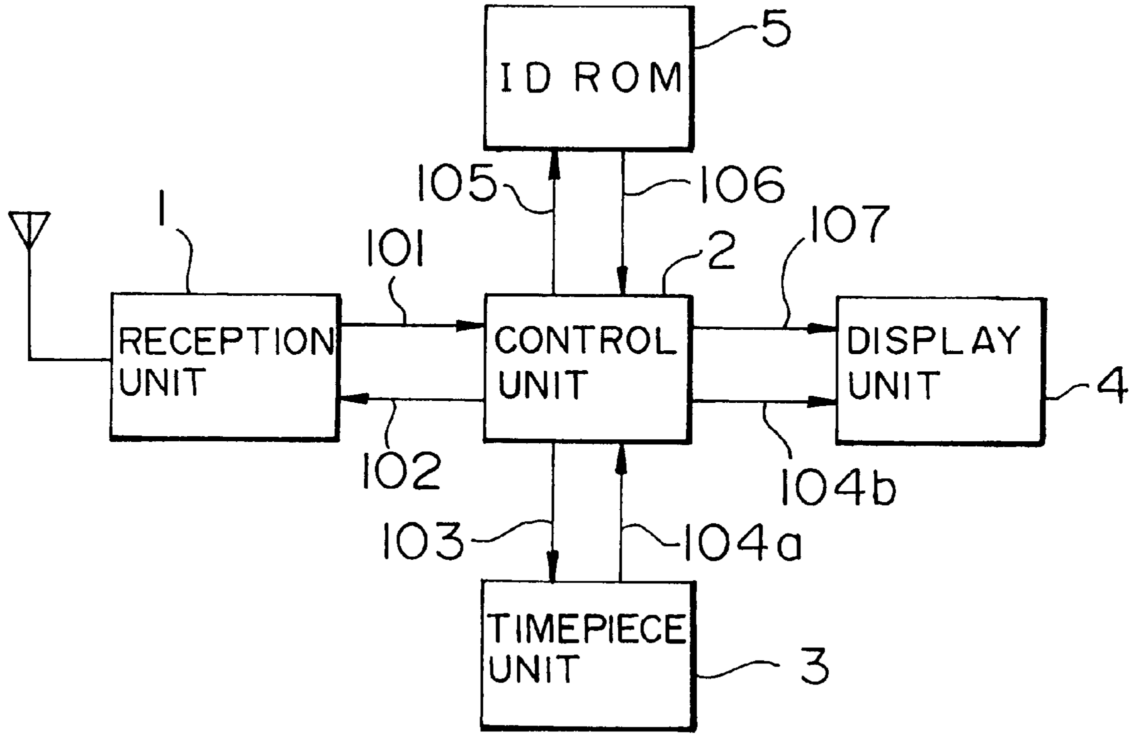
FIG. 1 is a block diagram showing the overall arrangement of an embodiment of the present invention.

Referring to FIG. 1, a radio selective paging receiver of the present invention is constituted by a reception unit 1, a control unit 2, a timepiece unit 3, a display unit 4, and an IDROM 5.

The reception unit 1 is controlled by an operation control signal 102 from the control unit 2. The reception unit 1 receives a radio selective paging signal from a radio transmission station (not shown), demodulates the signal, and outputs a demodulated data signal 101.

The control unit 2 reads out a self paging number (ID) 106 from the IDROM 5 in accordance with a read signal 105 and compares the ID with an ID contained in the data signal 101. The control unit 2 displays a received message 107 or time data 104*b* on the display unit 4. The control unit 2 also sends the time data or a reset signal 103 to the timepiece unit 3 in accordance with the received signal and receives time data 104*a* from the timepiece unit 3.

The operation of the radio selective paging receiver shown in FIG. 1 will be described next.

The selective paging signal from the radio transmission signal is demodulated by the reception unit 1. The control unit 2 detects and demodulates a sync signal and the ID. When the sync signal is detected by the control unit 2, an operation control signal 102 for battery savings is supplied to the reception unit 1. When the received ID matches the self ID stored in the IDROM 5, subsequent message and the like are received. The received message 107 or the time data 104*a* from the timepiece unit 3 is displayed on the display unit 4.

The selective paging signal contains a signal for time adjustment. Upon receiving the time adjustment signal, the control unit 2 issues a time setting command to the timepiece unit 3.

FIGS. 2A to 2E are timing charts showing the timing of time setting by the timepiece unit 3 in a first embodiment of the present invention.

Figures 2A, 2B, 2C, 2D, 2E, 2F, 2G, 2H:
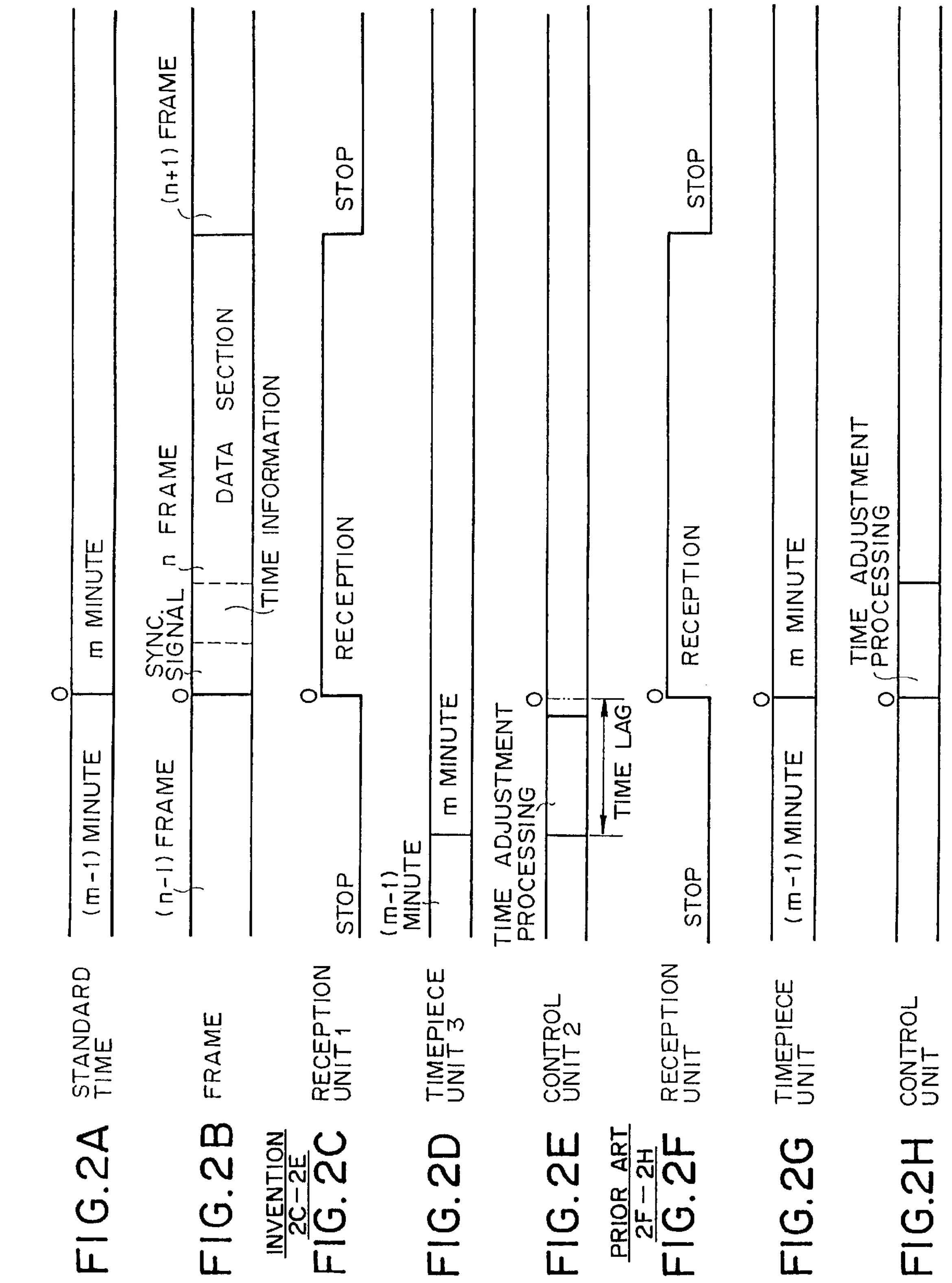
FIGS. 2A to 2H are timing charts associated with the time setting operations of the present invention and a prior art.

FIG. 2A shows the standard time. FIG. 2B shows the selective paging signal from the radio transmission station. FIGS. 2C to 2E show the operation of the reception unit 1, the time of the timepiece unit 3, and the operation of the control unit 2, respectively. FIGS. 2F to 2H show the operation of the reception unit, the time of the timepiece unit, and the operation of the control unit, respectively, in the prior art.

One frame of the selective paging signal has a length obtained by dividing one minute into, e.g., 32 equal parts. The Nth frame is transmitted at the timing of 0 second, e.g., at the timing of m minutes and 0 second, i.e., at the timing of the carry to the minute unit.

A frame n is constituted by a sync signal, time information, and a data section. The ID and message are inserted into the data section.

The reception unit 1 of the radio selective paging receiver for receiving the frame n stops its operation in the battery saving frame (n−1) and the battery saving frame (n+1) in accordance with the operation control signal from the control unit 2. In the frame n, the reception unit 1 performs reception, detects the time information, and sets the timepiece unit 3. At this time, the timepiece unit 3 is preset earlier by the time lag. Alternatively, the radio selective paging receiver is equipped with a timer for a time shorter than one minute independently of the timepiece unit to set the time at the timing of the next carry.

Conventionally, the time point at which the frame n is received is set at m minutes, as shown in FIGS. 2F to 2H. In this case, when self frame transmission starts, the control unit simultaneously starts time adjustment processing for an alarm or the like. For this reason, processing noise is generated by the control unit in self data reception.

To the contrary, in the radio selective paging receiver of the present invention, a carry to the minute unit of the timepiece unit 3 is generated earlier by the time lag in the frame (n−1). For this reason, by the time self data reception starts, time adjustment for an alarm or display change which is susceptible to noise generation is complete.

FIGS. 3A to 3E are timing charts showing the timing of time setting in the second embodiment of the present invention.

Figures 3A, 3B, 3C, 3D, 3E:
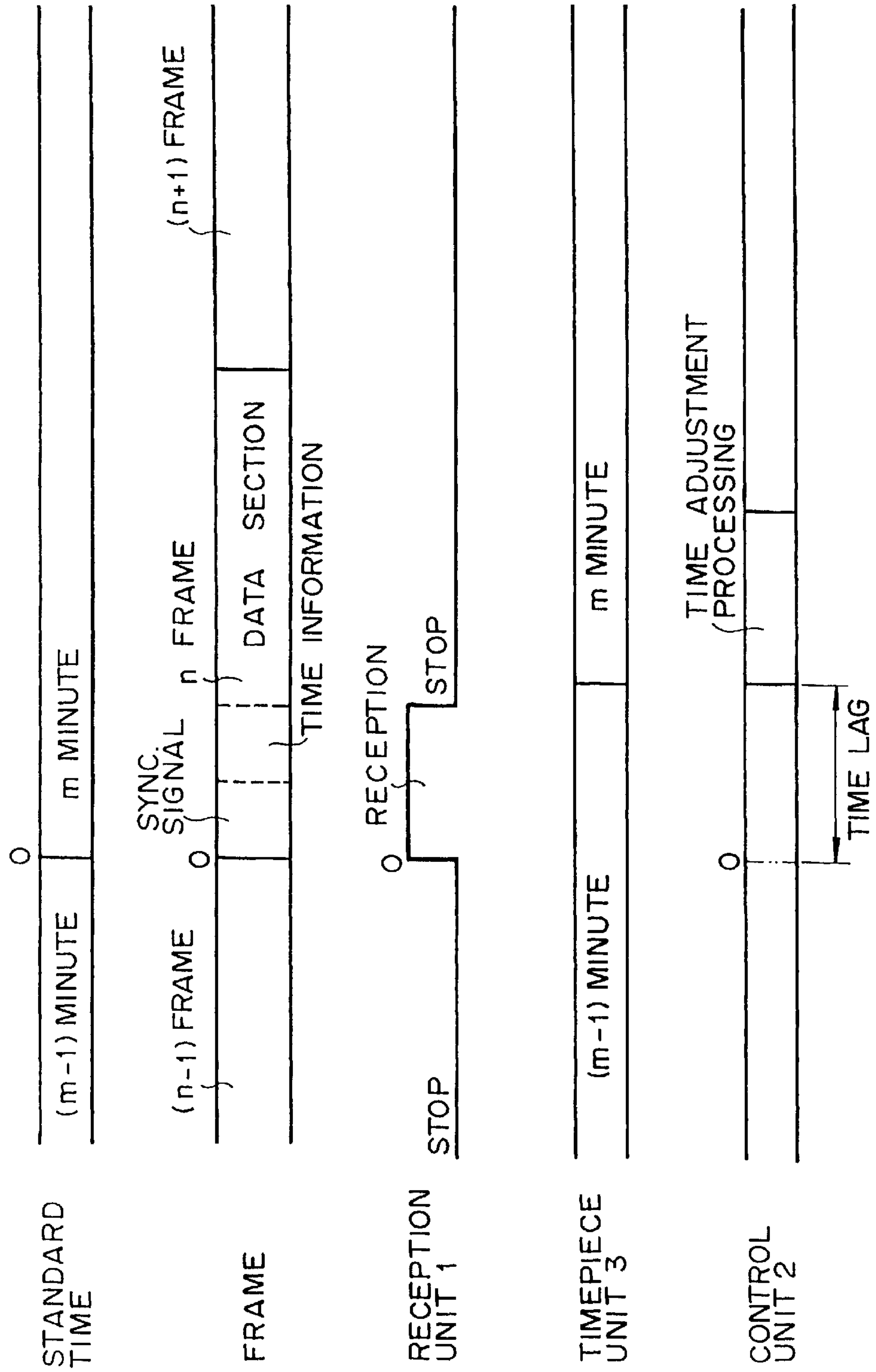
FIGS. 3A to 3E are timing charts associated with the time setting operation of another embodiment of the present invention.

FIG. 3A shows the standard time. FIG. 3B shows the selective paging signal from the radio transmission station. FIGS. 3C to 3E show the operation of a reception unit 1, the time of a timepiece unit 3, and the operation of a control unit 2, respectively.

In the second embodiment, a self data signal is sent in a frame other than a frame n, and time setting is performed in the frame n.

In accordance with an operation control signal from the control unit 2, the reception unit 1 of the radio selective paging receiver stops its operation in the frame (n−1) and the frame (n+1) other than the frame where the self signal is received. In the frame n, a receiving operation is performed at the timing when a sync signal and time information are received.

When timepiece processing starts at the start of transmission of the frame n, a carry to the minute unit is generated at the timing when the time information is received. Therefore, the timepiece unit 3 is preset to delay the updating timing of the carry to the minute unit by the time lag such that the carry to the minute unit is generated after the transmission timing of the time information.

FIG. 4 is a view showing an example of the time lag to be set. An optimum offset time is set for every frame containing the self signal.

Figure 5:
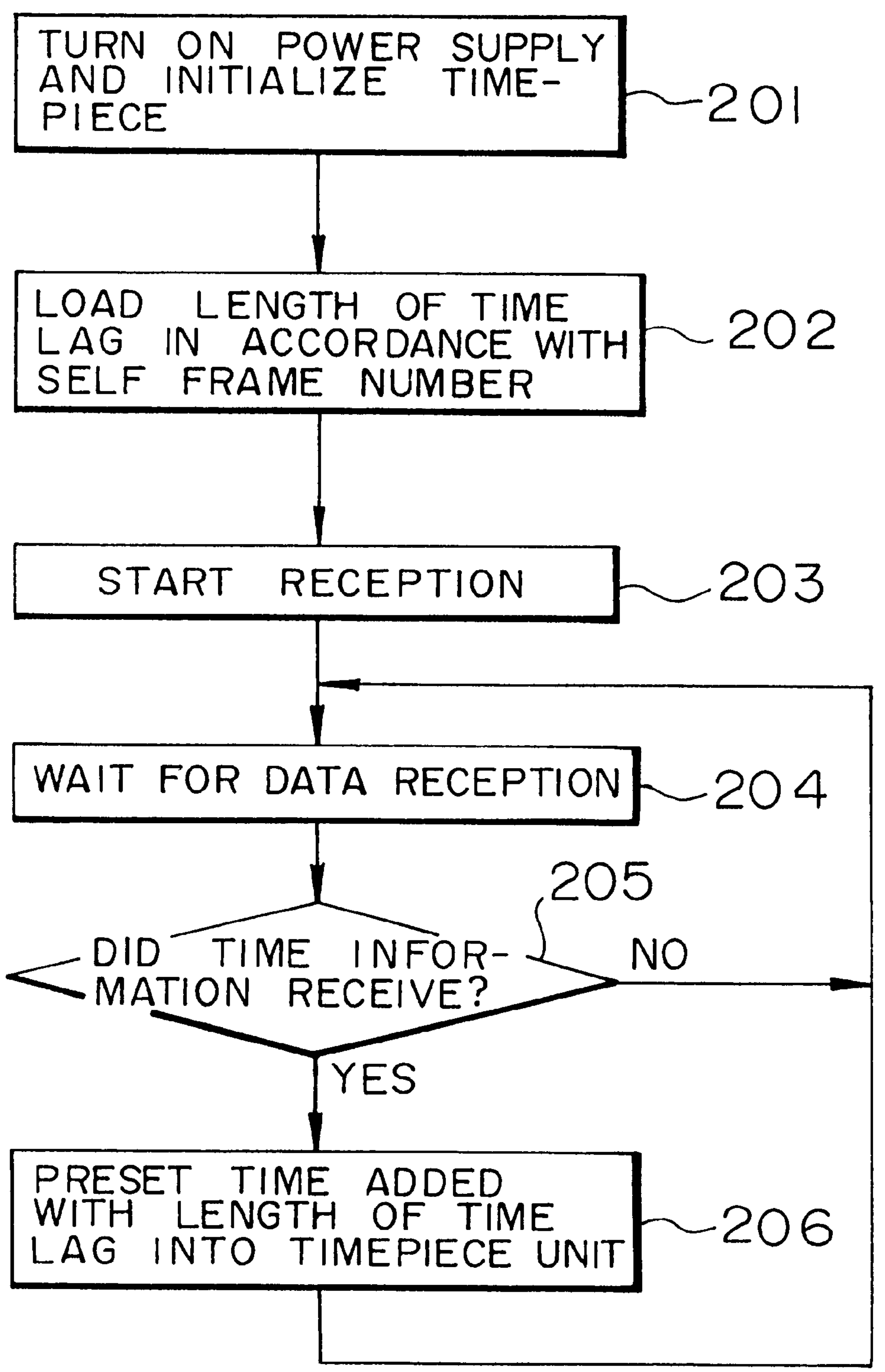
FIG. 5 is a flow chart showing an example of the operation in the embodiment shown in FIG. 1.

FIG. 5 is a f low chart showing the operation of the control unit 2 in the embodiment shown in FIG. 1.

When the power supply is turned on to use the radio selective paging receiver, the timepiece unit 3 is initialized (step 201). Frame information to be received by the self receiver and a corresponding time lag is read out from the IDROM 5 (step 202).

A receiving operation is started (steps 203 and 204). Upon receiving time information (step 205), a time added with the time lag is preset in the timepiece unit 3 (step 206).

In the above embodiment, the frame to be received is known in advance. In a recent system, however, the battery saving period is set by data to be transmitted. The processing operation of the control unit which can cope with such a variable system will be described below.

Figure 6:
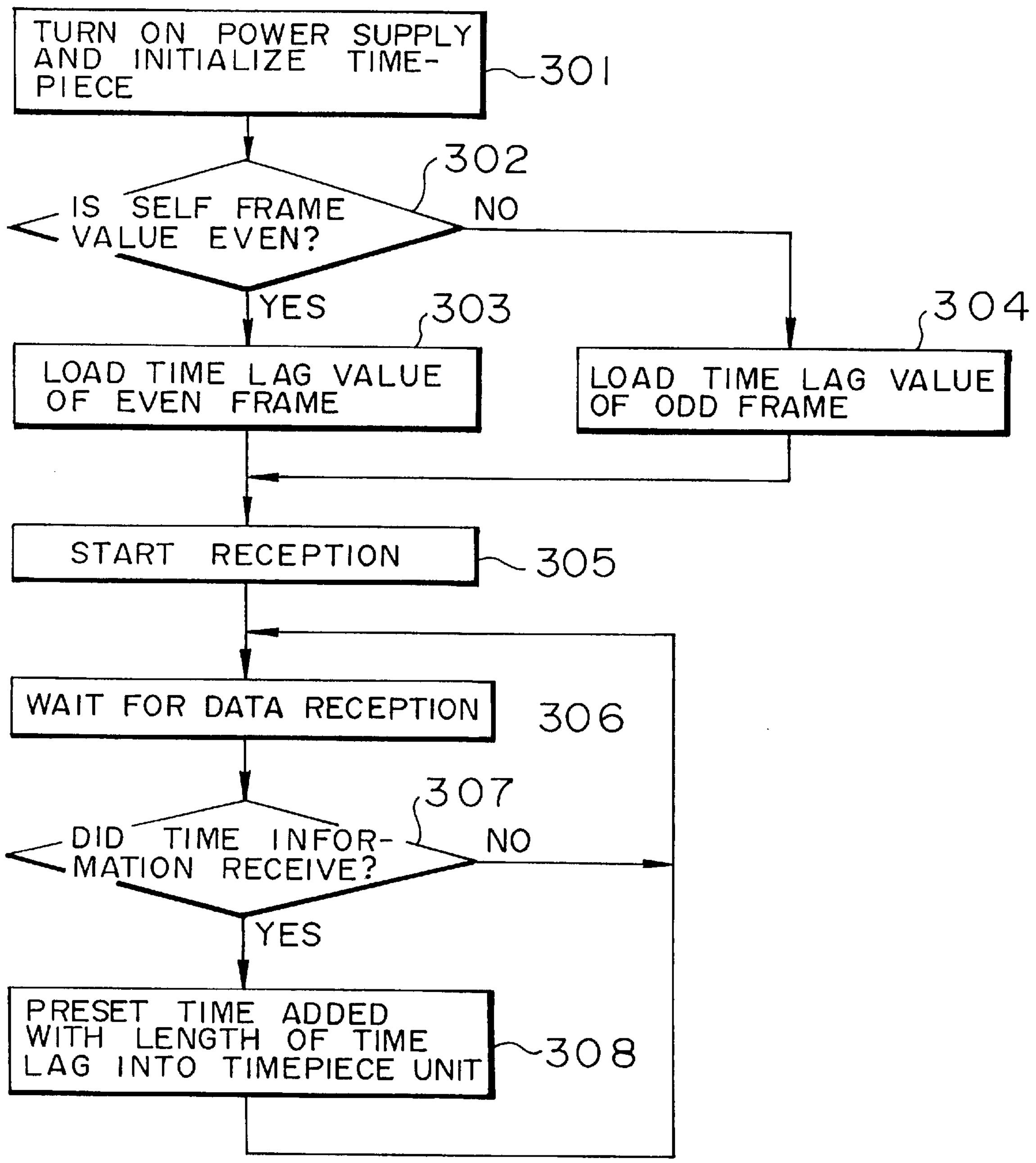
FIG. 6 is a flow chart showing another example of the operation in the embodiment shown in FIG. 1.

FIG. 6 is a flow chart showing another operation of the control unit according to the embodiment of the present invention.

Referring to FIG. 6, after frame information is read out from the IDROM 5, the offset times are classified into two patterns for even and odd self frames (step 302). It is customary to divide data into an even number of frames. Therefore, in a system in which the frame n and zero second are synchronized, a receiver for receiving an even frame is determined to be a frame n receiver which has a time lag shorter by the time adjustment processing time (step 303). For a receiver for receiving an odd frame, the self frame is never received at the timing when a carry to the minute unit is generated. Therefore, the receiver operates as a receiver other than the frame n receiver (step 304).

In the above embodiments, the radio selective paging receiver has been described. However, the arrangement is not limited to the radio selective paging receiver and can be applied to any system which adjusts the time in accordance with a received signal.

As has been described above, in the present invention, the minute is updated earlier or later by the time adjustment processing time. At the start of reception, timepiece processing which is prone to noise generation is complete. For this reason, the sensitivity does not suffer even in a receiver in which self group data is received at the timing of a carry to the minute unit on the precise time scale. Since this time adjustment processing time itself is sufficiently short to be sensed by a human being, it does not affect the precision of the timepiece.

The time information itself is placed at the start of the group or frame in transmission, and time adjustment is performed after that time. For this reason, the reception sensitivity of the time information itself can be prevented for being degraded without any influence of noise.

What is claimed is:

1. A radio selective paging receiver comprising:

a reception unit which is controlled to start operation simultaneously in synchronism with at least a standard time, receives a radio signal modulated by a selective paging signal containing time information in transmission information, and demodulates the radio signal;

a control unit for controlling operation of said reception unit, determining call reception and time information in accordance with the demodulated signal, and processing the call reception and the time information; and a timepiece unit for at least temporarily holding an obtained time;

wherein, in setting the time information, obtained by operating said reception unit, to said timepiece unit, said control unit adjusts the time with a predetermined time lag, such that a carry to a next minute or next hour signal is generated during a frame unit for battery saving, and is not generated during a predetermined timing of receiving self data.

2. A receiver according to claim 1, wherein, when the frame units for battery saving are defined by consecutive frame unit numbers, said control unit switches the time lag value depending on whether a self battery saving frame unit number is even or odd.

3. A receiver according to claim 1, wherein said control unit adjusts the time with the predetermined time lag at a time of receiving the time information such that the carry to the next minute or next hour signal unit is not generated during the predetermined timing of receiving self data.

* * * * *